Figure 3:
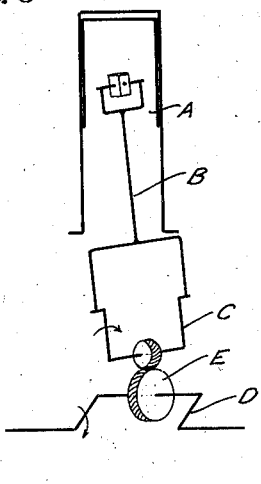

A. W. PATTINSON.
CRANK.
APPLICATION FILED MAY 10, 1920.
1,360,974.
Patented Nov. 30, 1920.
2 SHEETS—SHEET 1.
Fig. 1
Fig. 2
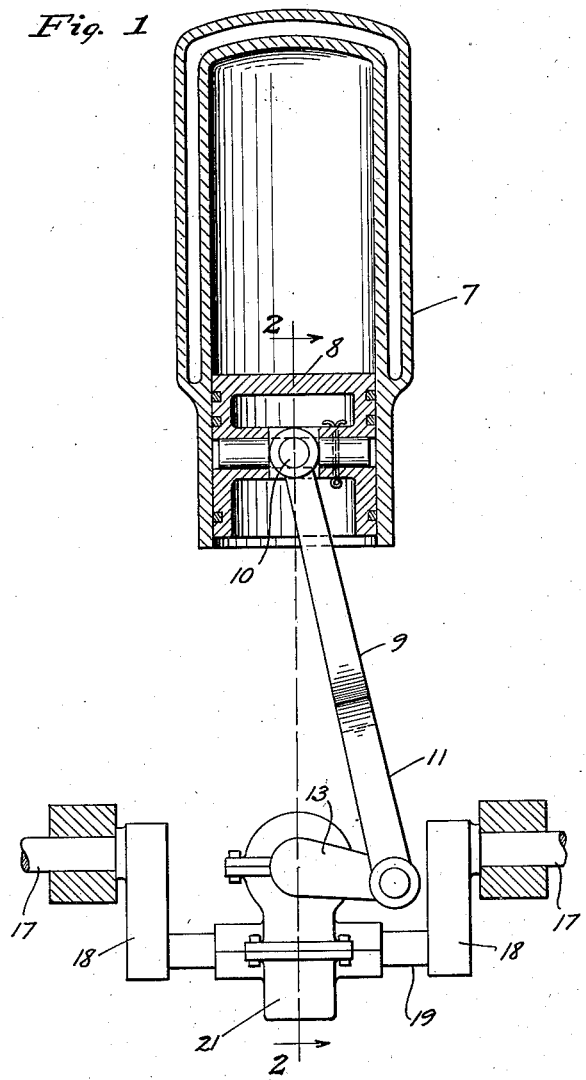
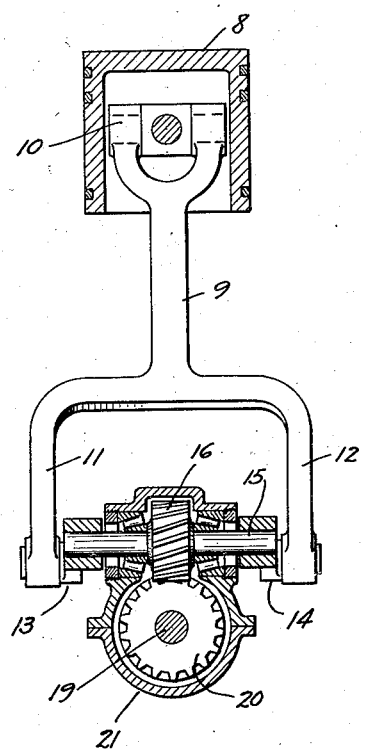
Inventor
Albert W. Pattinson
by Westall and Wallace
his Attorneys

A. W. PATTINSON.
CRANK.
APPLICATION FILED MAY 10, 1920.

1,360,974.

Patented Nov. 30, 1920.
2 SHEETS—SHEET 2.

Inventor
Albert W. Pattinson
by Newtall and Wallace
his Attorneys

UNITED STATES PATENT OFFICE.

ALBERT W. PATTINSON, OF LOS ANGELES, CALIFORNIA.

CRANK.

1,360,974.  Specification of Letters Patent.  Patented Nov. 30, 1920.

Application filed May 10, 1920. Serial No. 380,199.

*To all whom it may concern:*

Be it known that I, ALBERT W. PATTINSON, a citizen of the United States, residing at Los Angeles, in the county of Los Angeles and State of California, have invented new and useful Improvements in Cranks, of which the following is a specification.

This invention relates to a crank movement, and the primary object thereof is to provide a crank structure which has no dead center. Another object of this invention is to provide a crank for an engine which will have a quick outstroke with a uniform angular speed of the crank shaft. The invention is especially adapted for use with two cycle internal combustion engines.

These objects will be more fully understood, as will also other objects and corresponding accomplishments of my invention from the following detailed description of a preferred embodiment thereof. For the purpose of this description, reference is had to the accompanying drawing, in which:

Figure 1 is a front elevation of my improved crank movement with an engine cylinder and piston in cross section; Fig. 2 is a section taken on the line 2—2 of Fig. 1; Figs. 3, 4, 5, and 6 are diagrammatic views in perspective showing different positions of the crank and piston.

Referring more particularly to Figs. 1 and 2, an engine cylinder is indicated by 7. Mounted within the cylinder is a piston 8, to which is attached a piston rod 9 by means of a universal joint 10. Connecting rod 9 has a bifurcated end with arms 11 and 12. Arms 11 and 12 and pivotally connected to crank arms 13 and 14 fixed to a shaft 15 forming a dead center crank. Fixed to the center of shaft 15 is a helical gear 16.

The engine or main crank shaft is indicated by 17 and is provided with crank arms 18 connected by a crank pin shaft 19. Fixed to the crank pin shaft 19 is a gear 20 which meshes with gear 16, the particular ratio of gears shown herein being 2 to 1. Gears 16 and 20 are inclosed within a split housing 21 which also serves as a block connecting the dead center crank and main crank.

In the positions shown in Figs. 1 and 2 the main crank is in its lower or dead center position, that is, if the ordinary crank construction were used. It will be noted however, that crank arms 13 and 14 are not at dead center. Downward pressure on the piston 8 will cause crank arms 13 and 14 to be moved downwardly, rotating shaft 15, and by means of the gears 16 and 20 revolving crank pin shaft 19. The dead center crank shaft and the main crank shaft are placed in such relation that at the upper dead center, the dead center crank will revolve shaft 19 by means of the gearing. When the dead center crank is either in its upper or lower dead center position, the main crank pin shaft is not in dead center position. The operation will be better understood from an inspection of Figs. 3, 4, 5, and 6.

Figure 4:
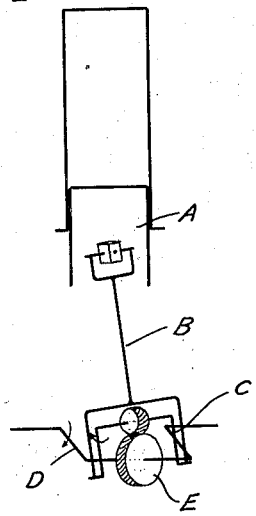
Figure 5:
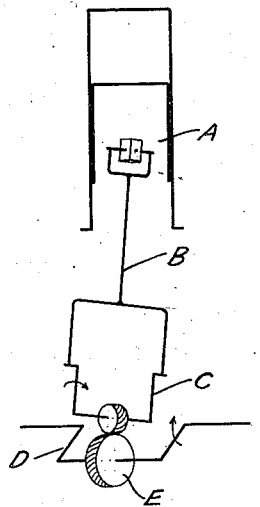
Figure 6:
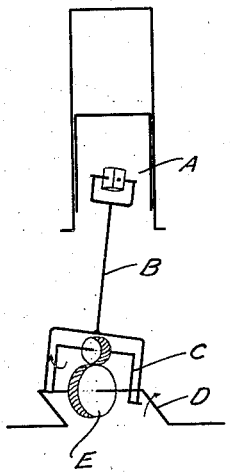

Referring to Fig. 3, A indicates the piston, which is in its upper position. The piston rod is indicated by B and is shown as ending in the bifurcated member. The dead center crank is indicated by C and the crank arms thereof are in line with the piston rod or in dead center position. The main crank D is advanced about 45° from the upper dead center position. The gearing connecting the main crank shaft and the dead center crank shaft is denoted by E. The gears are 2 to 1, so that for one revolution of the main crank shaft there are two revolutions of the dead center crank shaft. In Fig. 3, the piston is shown in its upper position. In Fig. 4 the main crank shaft is illustrated as having been advanced through 90° from the position shown in Fig. 3, while the dead center crank has advanced through 180°. In this position the dead center crank arms and piston rod are in line or upon dead center. However, the main crank shaft is not on lower dead center but 45° therefrom. The piston has reached its lower position in Fig. 4, and has traveled quickly from its upper to lower position due to the movement of the dead crank shaft and main crank shaft in the same direction. Referring to Fig. 5 the main crank is shown as having advanced through another 90°, and the dead center crank through another 180° bringing the piston rod and dead center crank to the same relative position as in Fig. 3. The movement of the main crank shaft from the position shown in Fig. 4 to that shown in Fig. 5 has carried the crank pin shaft through an angle which projected on the axis of the cylinder is first outwardly for 45° and then back inwardly for 45°. During this time the dead center crank shaft advances over a projected distance equal to the throw of the dead center crank shaft. The result is that piston A has not returned to its uppermost position, but has made an in-stroke. Referring to Fig. 6, the crank shaft is shown as having advanced through another 90°, and the dead center shaft through 180° bringing the dead center crank shaft and piston rod to a dead center position as in Fig. 4. The dead center shaft has moved in a projected direction opposite to that in which the main crank shaft has moved with the result that there has been an out-stroke of piston A but only a slight movement. Movement of the main crank shaft through another 90° will bring it into the position shown in Fig. 3, there being an instroke of the piston, and further movement will repeat the cycle just described.

Assuming that the piston A is that of a two cycle gas engine, the piston as shown in Fig. 3 is at the end of compression and ready to fire. In Fig. 4 the piston is shown at the end of its explosion stroke. Then upon movement of the main crank shaft from the position shown in Fig. 4, to that shown in Fig. 5, the exhaust stroke will have occurred. This is only a short stroke but is sufficient to scavenge the cylinder. In Fig. 6 the piston has moved on an out-stroke and the gas has been induced. Upon the next stroke it is compressed and the piston reaches the position shown in Fig. 3 where it is again ready to fire.

If the gear ratio is changed there will be a variation in the strokes. However, there will be no dead center of the combined crank movement. Although I have shown in Figs. 1 and 2 a spiral gear, my invention is not limited to any particular type of gearing, but only broadly to gearing positively connecting the dead center crank shaft and main crank shaft.

What I claim is:

1. In a crank movement, the combination of a main crank, a dead center crank with its axis at an angle to the main crank axis, and gearing positively connecting said cranks, so that the latter are not simultaneously at dead center.

2. In a crank movement, the combination of a main crank, a dead center crank with its axis at 90° to the main crank axis, and gearing positively connecting said cranks so that the latter are not simultaneously at dead center.

3. In a crank movement, the combination of a main crank, a dead center crank with its axis at an angle to the main crank axis, and gearing in the ratio of 2 and 1 positively connecting said cranks so that the dead center crank revolves twice the angular speed of the main crank.

4. In a crank movement, the combination of a main crank, a dead center crank with its axis at 90° to the main crank axis, and gearing in the ratio of 2 to 1 positively connecting said cranks so that the dead center crank revolves twice the angular speed of the main crank.

In witness that I claim the foregoing I have hereunto subscribed my name this 3rd day of May, 1920.

ALBERT W. PATTINSON.